United States Patent
Berdou et al.

(10) Patent No.: US 10,267,164 B2
(45) Date of Patent: Apr. 23, 2019

(54) BLADE HAVING PLATFORMS INCLUDING INSERTS

(71) Applicant: Safran Aircraft Engines, Paris (FR)

(72) Inventors: Caroline Jacqueline Denise Berdou, Moissy-Cramayel (FR); Alexandre Bernard Marie Boisson, Moissy-Cramayel (FR); Matthieu Arnaud Gimat, Moissy-Cramayel (FR); Audrey Laguerre, Moissy-Cramayel (FR)

(73) Assignee: SNECMA, Paris (FR)

( * ) Notice: Subject to any disclaimer, the term of this patent is extended or adjusted under 35 U.S.C. 154(b) by 41 days.

(21) Appl. No.: 15/569,161

(22) PCT Filed: Apr. 26, 2016

(86) PCT No.: PCT/FR2016/050981
§ 371 (c)(1),
(2) Date: Oct. 25, 2017

(87) PCT Pub. No.: WO2016/174345
PCT Pub. Date: Nov. 3, 2016

(65) Prior Publication Data
US 2018/0135436 A1 May 17, 2018

(30) Foreign Application Priority Data
Apr. 29, 2015 (FR) ...................... 15 53847

(51) Int. Cl.
*F01D 5/28* (2006.01)
*B29B 11/16* (2006.01)
(Continued)

(52) U.S. Cl.
CPC .............. *F01D 5/282* (2013.01); *B29B 11/16* (2013.01); *B29C 70/222* (2013.01);
(Continued)

(58) Field of Classification Search
CPC . F01D 5/28; F01D 5/282; B29B 11/16; B29C 70/222; B29D 99/0025;
(Continued)

(56) References Cited

U.S. PATENT DOCUMENTS

2017/0326757 A1\* 11/2017 Marin ..................... F01D 5/284
2018/0119550 A1\* 5/2018 Berdou ..................... F01D 5/26

FOREIGN PATENT DOCUMENTS

WO    WO 2010/061140 A1    6/2010
WO    WO 2013/079860 A1    6/2013
(Continued)

OTHER PUBLICATIONS

International Search Report and English translation dated Aug. 17, 2016, in International Application No. PCT/FR2016/050981 (6 pages).

*Primary Examiner* — Hieu T Vo
(74) *Attorney, Agent, or Firm* — Bookoff McAndrews, PLLC (57) ABSTRACT

A fiber preform for a turbine engine blade and a single-piece blade suitable for being made by means of such a preform, a bladed wheel, and a turbine engine including such a blade; the fiber preform obtained by three-dimensional weaving comprises a first longitudinal segment (41) suitable for forming a blade root, a second longitudinal segment (42) extending the first longitudinal segment (41) upwards and suitable for forming an airfoil portion, a first transverse segment (51) extending transversely from the junction between the first and second longitudinal segments (41, 42), and suitable for forming a first platform; the first transverse segment (51) includes at least one non-interlinked portion comprising a top strip (51*b*) and a bottom strip (51*a*), and at
(Continued)

least one insert (61) is arranged between the top and bottom strips (51*b*, 51*a*) of the non-interlinked portion of the first transverse segment (51).

13 Claims, 5 Drawing Sheets

(51) Int. Cl.
    *B29D 99/00*      (2010.01)
    *B29C 70/22*      (2006.01)
    *D03D 25/00*      (2006.01)
    *B29L 31/08*      (2006.01)

(52) U.S. Cl.
    CPC ....... *B29D 99/0025* (2013.01); *D03D 25/005* (2013.01); *B29L 2031/08* (2013.01); *F05D 2300/603* (2013.01); *F05D 2300/6012* (2013.01); *Y02T 50/672* (2013.01); *Y02T 50/673* (2013.01)

(58) Field of Classification Search
    CPC ............. B29L 2031/08; D03D 25/0025; F05D 2300/6012; F05D 2300/603; Y02T 50/672; Y02T 50/673
    See application file for complete search history.

(56) References Cited

FOREIGN PATENT DOCUMENTS

| | | |
|---|---|---|
| WO | WO 2013/104852 A2 | 7/2013 |
| WO | WO 2014/076408 A1 | 5/2014 |

\* cited by examiner

BLADE HAVING PLATFORMS INCLUDING INSERTS

CROSS-REFERENCE TO RELATED APPLICATIONS

This application is the U.S. national phase entry under 35 U.S.C. § 371 of International Application No. PCT/FR2016/050981, filed on Apr. 26, 2016, which claims priority to French Patent Application No. 1553847, filed on Apr. 29, 2015, the entireties of which are herein incorporated by reference.

FIELD OF THE INVENTION

The present description relates to a fiber preform for a turbine engine blade and to a single-piece blade suitable for being formed by means of such a preform, to a bladed wheel, and to a turbine engine including such a blade.

Such a preform can be used for making blades as single pieces, each having aerodynamic platforms that are provided with inserts of various kinds. Such blades may in particular be fan blades of an airplane turbojet, to mention just one example.

STATE OF THE PRIOR ART

In order to reduce the weight of airplane turbojets, and thus reduce the consumption of such turbojets, it is now known to fabricate some of the blades of the jet out of composite material, which is much lighter than the metal that was conventionally used in the past.

For this purpose, it is also known nowadays to use three-dimensional weaving techniques in order to obtain fiber preforms that give rise to composite blades of very good quality. Document WO 2014/076408 describes in particular a method of weaving a fiber preform that makes it possible to obtain in single-piece manner blades that are provided with pressure side and suction side platforms, those platforms being of constant thickness.

Nevertheless, those platforms need to satisfy a large number of requirements and to perform numerous functions. Mainly, such platforms need to perform an aerodynamic function of defining and channeling the air streams flowing through the turbojet. Nevertheless, they also need to provide mechanical strength that is guaranteed for all stages of flight and they must also provide coherent integration in the environment of the engine, in particular avoiding introducing downstream disturbances in the air stream. Thus, the shape of platforms needs to be finely controlled, throughout the operation of the engine, and regardless of the stage of flight.

Unfortunately, in particular during tests and simulations carried out on such blades, the inventors have found that various zones of those platforms derived from 3D weaving become deformed to a greater or lesser extent under the effect of centrifugal forces that act while the turbine engine is in operation. In particular, the inventors have observed that the deformation of a zone of a platform increases with increasing distance of that zone from the airfoil.

Under such circumstances, those platforms present shape irregularities in operation that can disturb the air stream and thus the efficiency of the turbine engine. In addition, the inventors have observed that, amongst other things, the bending depends on cantilever length. Thus, since the cantilever length differs between the pressure side and suction side platforms of two consecutive blades, there is a discontinuity of bending at that interface, leading to a risk of the platforms overlapping.

There thus exists a real need for a fiber preform, a blade, a bladed wheel, and a turbine engine that avoid the drawbacks inherent to the above-mentioned known systems, at least to some extent.

SUMMARY OF THE INVENTION

The present description relates to a fiber preform for a turbine engine blade, the preform being obtained by three-dimensional weaving and comprising a first longitudinal segment suitable for forming a blade root, a second longitudinal segment extending the first longitudinal segment upwards and suitable for forming an airfoil portion, and a first transverse segment extending transversely from the junction between the first and second longitudinal segments, and suitable for forming a first platform, wherein the first transverse segment includes at least a non-interlinked portion comprising a top strip and a bottom strip, and wherein at least an insert is arranged between the top and bottom strips of the non-interlinked portion of the first transverse segment.

By means of such a preform, it is possible to obtain in single-piece manner a blade comprising a blade root, an airfoil portion, and at least one platform having at least one insert enabling the shape of the platform to be improved, enabling this shape to be kept under control during operation of the engine, and/or enabling the platform to be given certain functions such as mechanical strength functions or integration functions.

Depending on the weaving strategy used, the transverse segment that gives rise to the platform may naturally comprise two non-interlinked strips, i.e. strips that are free to be moved relative to each other. In other weaving strategies, the transverse segment that leads to the platform is normally a single piece: nevertheless, under such circumstances, it is easy to make provision for non-interlinking at the base of the transverse segment so as to split it into two non-interlinked strips. In both situations, it is then easy to introduce one or more inserts into the space between the non-interlinked strips once they have been folded towards each other into their transverse final position.

Under such circumstances, depending on the function that is to be given to the platform, it is possible to introduce a wide variety of inserts into this space, and in particular inserts of various shapes and compositions.

Thus, by means of this preform, it is possible to benefit from the advantages of a 3D woven single-piece blade (weight saving; small number of parts; simplified assembly and maintenance, etc.) while ensuring that other conventional functions for such platforms can be guaranteed correctly.

In the present description, the terms "longitudinal", "transverse", "bottom", "top", and their derivatives are defined relative to the main direction of the blade in question, the blade root being situated at the bottom end of the blade in this frame of reference; the terms "proximal", "distal", and their derivatives are defined relative to the airfoil of the blade; the terms "axial", "radial", "tangential", and their derivatives are defined relative to the main axis of the wheel having these blades, i.e. in general, the axis of the turbine engine. The term "axial plane" designates a plane containing the main axis of the turbine engine and the term "radial plane" designates a plane perpendicular to the main axis; the term "longitudinal plane" designates a plane parallel to the main direction of the blade and perpendicular to the direction in which the blade root extends: such a longitudinal plane is thus a radial plane in the reference frame of the turbine engine. In addition, the terms "upstream" and "downstream" are defined relative to the flow of air through the turbine engine.

Finally, the term "three-dimensional weaving" is used to designate a weaving technique in which weft yarns move within an array of warp yarns in such a manner as to form a three-dimensional mesh of yarns in a three-dimensional weave: all of the layers of yarns in such a fiber structure are thus woven during a single weaving step within a three-dimensional loom.

In certain embodiments, at least an insert is a wire. It may in particular be a metal wire, a carbon wire, or a SiC wire, e.g. of the same nature as the yarns used for weaving the fiber preform. Unlike the main yarns of fiber structure having orientations that are determined by the weaving strategy used, such a wire benefits from complete freedom in how it is oriented. It is thus possible to arrange it in any direction along which it is desired to stiffen the platform. Wires of increased stiffness serve to reduce out-of-specification movements.

In certain embodiments, at least an insert is a two-dimensional woven web. Such a two-dimensional web can make it possible, either locally or over the entire surface area of the transverse segment, to increase the thickness of the preform and thus of the resulting platform. Such a web may be made in particular out of the same material as the remainder of the fiber preform. Nevertheless, it can be understood in this example that such a web is independent of the main fiber structure of the three-dimensionally woven preform and that it is fitted therein between the top and bottom strips of the non-interlinked portion of its first transverse segment. A plurality of webs of this type may be superposed, and optionally assembled to one another, and inserted between the top and bottom strips in order to obtain greater thickness. Under certain circumstances, these webs may also serve to reduce out-of-specification movements if the selected material is of greater stiffness.

In certain embodiments, at least an insert is a block of three-dimensionally woven fibers. Such a fiber block that is woven three-dimensionally but independently of the main fiber structure of the preform, makes it easy to increase the thickness of the transverse segment, and thus of the resulting platform, without impacting the strategy for weaving the remainder of the fiber preform. In particular, such a fiber block may be made out of the same material as the remainder of the fiber preform. The fiber block serves to provide stiffness in several directions, and above all to provide stiffness that may differ in different directions.

In certain embodiments, the thickness and/or the number of fiber blocks may vary.

In certain embodiments, at least an insert is made of honeycomb material or of a foam. Such an insert that is independent of the main fiber structure of the preform and that is placed between the top and bottom strips makes it easy to increase the thickness of the transverse segment, and thus of the resulting platform, without impacting the strategy for weaving the remainder of the fiber preform. Such an insert makes it possible to have large thicknesses without significant increase in weight. The bending behavior of the platform is thus further improved.

In certain embodiments, at least an insert is a gap filler serving to fill in a gap in the preform. Such a gap filler can thus fill in a gap in the preform that results from non-interlinking, from a layer crossing, or merely from folding the preform. It may in particular be a braid, a twisted strand of carbon fibers, or indeed a rod of optionally filled resin. Such an insert can also provide stiffness in localized manner.

In certain embodiments, at least an insert is a stiffener including a rod and a rigid plate. Such a stiffener serves to reinforce mechanical strength of the platform, in particular against centrifugal forces. In particular, such a stiffener ensures that the platform deforms in more regular manner under the effect of centrifugal force while the turbine engine is in operation. Specifically, the presence of this stiffener serves to secure the various zones of the platform together better, thereby tending to ensure that the radial deformations are more uniform. This can be thought of as averaging the deformations of the preform, with the zones that are usually greatly deflected pulling outwards the zones that are usually less deflected, while those zones hold inwards the zones that are subjected to greater centrifugal force. Under such circumstances, the platform in operation conserves a profile that is relatively regular. This contributes to maintaining the regularity of the air stream and also to ensuring that the platform can be integrated correctly in the environment of the engine. Such a stiffener may in particular be made of metal, or else it may be made of glass fibers.

In certain embodiments, the section of the stiffener varies. In this way, it is possible to take account of the shape of the platform in order to compensate more effectively for the deformations of the platform. In particular, such varying thickness makes it possible to adjust both the stiffness of the stiffener, and thus the transmission of forces from one zone to another of the platform, and also the weight that is added locally to the platform, and thus adjust locally the centrifugal forces exerted on the platform. In particular, by locally adding weight to a zone of the platform that is usually less deflected, the magnitude of centrifugal force in that zone is increased, such that the zone deflects a little more and comes more easily into alignment with the neighboring zones that are naturally deflected to a greater extent.

In certain embodiments, at least an insert is arranged axially along the first transverse segment. Such an insert thus enables the platform to be stiffened axially between its upstream and downstream ends, in particular so as to ensure uniformity for the air stream.

In certain embodiments, at least an insert is arranged along the proximal end of the first transverse segment. Depending on the weaving strategy used, a gap may be present in the preform along the proximal end of the first transverse segment: such a gap, generally caused by yarn exits, then gives rise locally to a smaller fiber volume fraction and thus to making this portion of the blade weaker. Such an insert then enables this gap to be filled in.

In certain embodiments, at least an insert is arranged along the distal end of the first transverse segment. This increases the stiffness of the platform in its zone that is furthest away from the airfoil, i.e. its zone that is subjected to the greatest centrifugal torque and that thus usually suffers the largest amount of deformation. This contributes to ensuring that the distal end of the platform is uniform. In addition, such a stiffener arranged in this location can constitute an abutment preventing the platform from overlapping the platform of the neighboring blade, e.g. in the event of a violent impact as a result of ingesting a bird.

In certain embodiments, at least an insert is arranged tangentially from the proximal end to the distal end of the first transverse segment. Such a segment thus makes it possible to stiffen the platform tangentially between its distal end and its junction with the airfoil, thus making it possible to reduce the amplitude of the deformation of the distal end of the platform.

In certain embodiments, at least an insert is arranged tangentially, substantially along the longest tangential portion of the first transverse segment. Specifically, the further a zone is away from the airfoil, the greater the lever arm of the centrifugal forces acting on that zone, and thus the zone is subjected to more deformation in operation. Under such circumstances, the stiffeners are particularly useful in the furthest-away zones in order to reduce the amplitude of the large deformations that are normally observed in those zones.

In certain embodiments, at least an insert is arranged tangentially along the upstream or downstream end of the first transverse segment. Specifically, for the suction side platform, the upstream and downstream ends of the platform are zones of the platform that present the greatest offset from the airfoil. Under such circumstances, in application of the above-mentioned logic, stiffeners are particularly useful in these zones in order to reduce the amplitude of their deformations in operation.

In certain embodiments, the first transverse segment includes at least an axial tab extending substantially axially from the upstream end and/or the downstream end of the first transverse segment, said axial tab comprising a top strip and a bottom strip, and at least an insert is arranged between the top and bottom strips of said axial tab. Such a tab enables the platform to co-operate with upstream and/or downstream rotary casings, thus enabling the deformation of the upstream and/or downstream ends of the platform to be blocked while the engine is in operation. Such an insert thus enables the tab to be reinforced so as to improve its mechanical strength.

In certain embodiments, the fiber preform comprises a second transverse segment extending transversely from the junction between the first and second longitudinal segments extending the first transverse segment and going away therefrom, being suitable for forming a second platform; the second transverse segment includes at least a non-interlinked portion comprising a top strip and a bottom strip; and at least an insert is arranged between the top and bottom strips of the non-interlinked portion of the second transverse segment.

It can naturally be understood that all of the characteristics mentioned above concerning the first transverse segment can be transposed to the second transverse segment.

In certain embodiments, one of the strips of the first transverse segment, and preferably the top strip, is woven in non-interlinked manner with the second longitudinal segment; this strip thus extends a layer or a series of layers of the first longitudinal segment. The other strip of the first transverse segment, preferably the bottom strip, is preferably woven in non-interlinked manner with the first longitudinal segment; this strip thus extends a layer or a series of layers of the second longitudinal segment. This is a weaving strategy that is nowadays well proven, which is described in application WO 2014/076408, and which leads naturally to a transverse segment being formed that is made up of two non-interlinked strips. Such layer crossing is preferably provided at the junction between the top and bottom strips of the transverse segment and the longitudinal segment. The strips of the transverse segment may also be stitched together at their distal ends so as to close that end of the cavity in which the inserts are placed. Where appropriate, the second transverse segment may be stitched in analogous manner.

In other embodiments, each of the strips of the first transverse segment is woven in non-interlinked manner with the second longitudinal segment; each strip thus extends a layer of a series of layers of the first longitudinal segment. This weaving strategy is derived from a weaving strategy that is nowadays well proven, and which is described in particular in application WO 2013/104852, with additional non-interlinking being introduced in the transverse segment in order to form the non-interlinked top and bottom strips. Such non-interlinking may extend to the distal end of the transverse segment, in which case the two strips are free, or it may terminate with before the distal end, such that the two strips are attached to each other at their distal ends. Where appropriate, the second transverse segment may be woven in analogous manner.

In other embodiments, each of the strips of the first transverse segment is woven in non-interlinked manner with the second longitudinal segment, and each of the strips of the second transverse segment is woven in non-interlinked manner with the first longitudinal segment; the strips of the first transverse segment then extend the strips of the second transverse segment. This weaving strategy is derived from another weaving strategy that is likewise well proven, as described in particular in application WO 2010/061140, with additional non-interlinking being introduced in each transverse segment in order to form the top and bottom non-interlinked strips. Such non-interlinking may extend as far as the distal end of the transverse segment, in which case the two strips are free, or else it may come to an end before the distal end, such that the two strips are attached to each other at their distal ends.

In certain embodiments, the yarns used for weaving the preform are carbon fibers. Nevertheless, they could be any other type of yarn, for example glass fibers or Kevlar fibers.

In certain embodiments, the weave used for the three-dimensional weaving of the preform is of the 3D interlock type. Nevertheless, the outside surfaces of the preform may be made essentially by two-dimensional weaving, e.g. of the satin type.

The present description also provides a blade for a turbine engine, the blade comprising a blade root, an airfoil portion extending upwards from the blade root, and a platform extending transversely to the airfoil portion at the junction between the blade root and the airfoil portion; wherein the platform is made of composite material and has at least a portion including, embedded in a common matrix, a first piece of woven reinforcement, a second piece of woven reinforcement, and an insert arranged between the first and second pieces of woven reinforcement.

It can be understood that this blade corresponds to the blade that can be obtained using the above preform. In particular, the woven reinforcement is preferably three-dimensionally woven fiber reinforcement. Under such circumstances, all of the above-described characteristics and advantages are transposed directly to this blade, whatever the technique used for obtaining it.

In certain embodiments, the blade is made in single-piece manner out of composite material by means of a fiber preform in accordance with the above embodiments, said preform being shaped in a mold and being embedded in a matrix, preferably of organic type.

In certain embodiments, the matrix is of organic type. In particular it may be an epoxy resin.

In other embodiments, the matrix is of ceramic type.

The present description also relates to a bladed wheel for a turbine engine, and having a plurality of blades in accordance with any of the preceding embodiments.

It may be a rotor wheel, such as a fan, in which the blades are arranged angularly around a rotary hub, or it may be a stator wheel, in which the blades are vanes arranged angularly within a stationary ring.

The present description also provides a turbine engine, including at least a blade or at least a bladed wheel in accordance with any preceding embodiment.

The above-mentioned characteristics and advantages, and others, appear on reading the following detailed description of embodiments of the preform, of the blade, of the bladed wheel, and of the turbine engine that are proposed. The detailed description is made with reference to the accompanying drawings.

BRIEF DESCRIPTION OF THE DRAWINGS

The accompanying drawings are diagrammatic and seek above all to illustrate the principles of the invention.

In the drawings, from one figure to another, elements (or portions of an element) that are identical are referenced using the same reference signs. Furthermore, elements (or portions of an element) belonging to different embodiments but having analogous functions are identified in the figures by numerical references increased by 100, 200, etc.

DETAILED DESCRIPTION OF EMBODIMENTS

In order to make the invention more concrete, embodiments are described in detail below with reference to the accompanying drawings. It should be understood that the invention is not limited to these embodiments.

Figure 1:
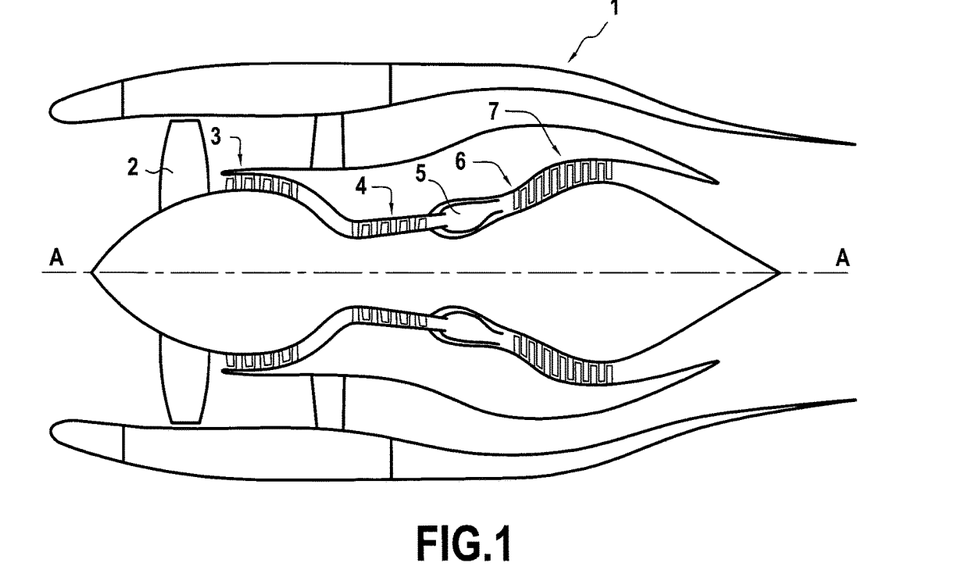
FIG. 1 is an axial section view of a turbine engine of the invention.

FIG. 1 is a section view of a bypass turbojet 1 of the invention, the section being on a vertical plane containing the main axis A of the jet. Going from upstream to downstream in the flow direction of the air stream, it comprises a fan 2, a low pressure compressor 3, a high pressure compressor 4, a combustion chamber 5, a high pressure turbine 6, and a low pressure turbine 7.

Figure 2:
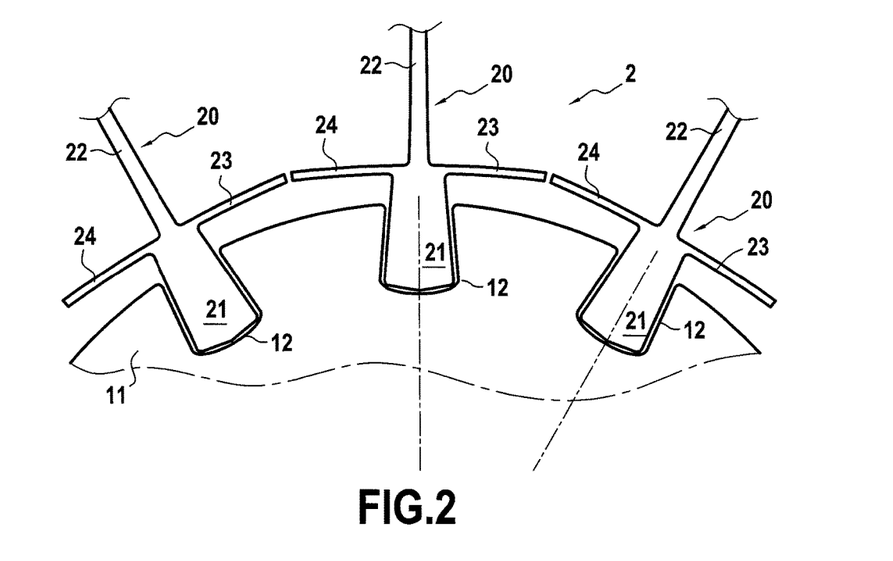
FIG. 2 is a fragmentary radial section diagram of a bladed wheel of the invention.

As shown in FIG. 2, the fan 2 has a plurality of fan blades 20 mounted angularly around the axis A on a disk 11 that is connected to the low pressure shaft of the turbine engine 1.

Figure 3:
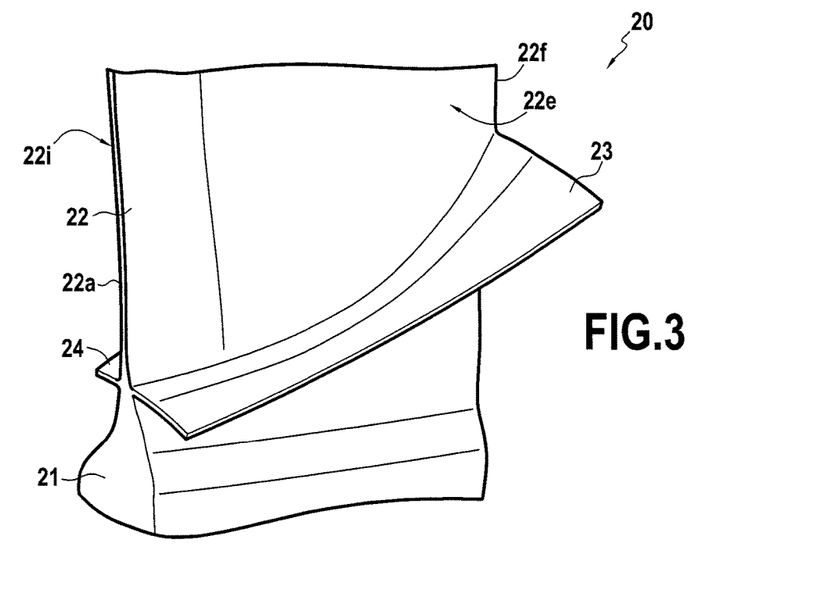
FIG. 3 is a fragmentary perspective view of a blade constituting an embodiment.

Such a fan blade is shown in FIG. 3. It comprises a blade root 21 of dovetail-shape configured to engage in a slot 12 of the disk 11 so as to secure it to the disk 11. The blade root 21 is extended upwards by an airfoil 22 presenting a suction side face 22$e$ and a pressure side face 22$i$ each going from upstream to downstream between a leading edge 22$a$ and a trailing edge 22$f$.

The blade 20 also has a suction side platform 23 extending transversely from the suction side of the blade from the junction between the blade root 21 and the airfoil 22, and a pressure side platform 24 extending transversely from the pressure side of the blade from the junction between the blade root 21 and the airfoil 22.

Figure 4A:
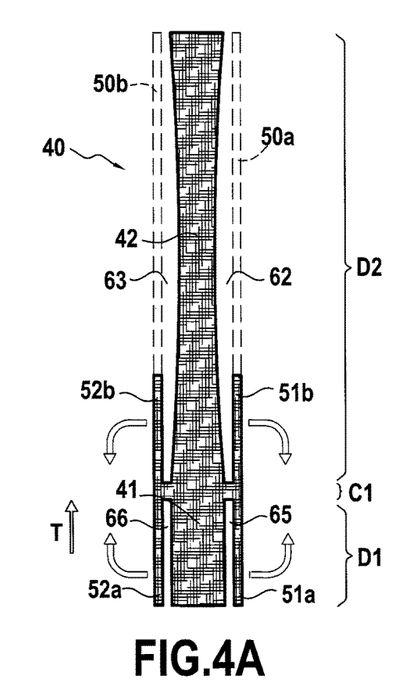
FIGS. 4A and 4B are diagrams showing the preform corresponding to this first blade embodiment and to its shaping.
Figure 4B:
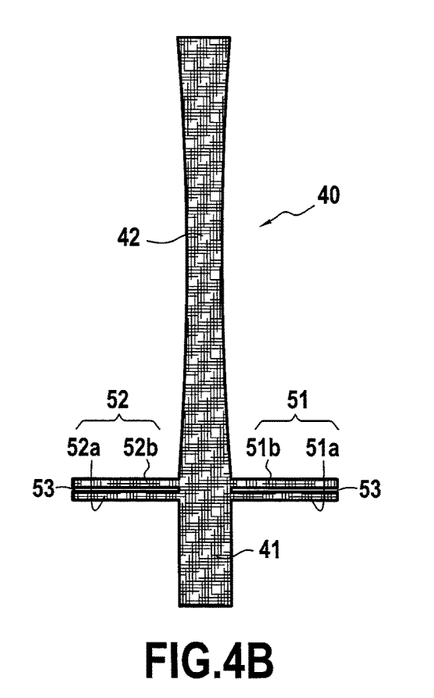

FIG. 4A shows the three-dimensionally woven preform 40 suitable for making this first blade embodiment 20. FIG. 4B shows the same preform 40 after it has been shaped. The preform 40 is described from upstream to downstream in the weaving direction T, i.e. upwards in the figures. Nevertheless, it should be understood that the weaving could be performed from the other end and in the opposite direction.

In this embodiment, the preform 40 is three-dimensionally woven out of carbon fibers with a 3D interlock weave. Only the surfaces of the preform 40 are two-dimensionally woven using a satin type weave.

At the upstream end, weaving begins with a first zone D1 of non-interlinking in which a bottom free strip 51$a$ of a first transverse segment 51, a first longitudinal segment 41, and a bottom free strip 52$a$ of a second transverse segment 52 are woven jointly in non-interlinked manner with respective planes 65 and 66 of non-interlinking. The first longitudinal segment 41 is used in the end for forming the root 21 of the blade 20.

Downstream from this first zone D1 of non-interlinking, a layer crossing zone C1 forms an interface with a second zone D2 of non-interlinking in which a first free strip 50$a$, a second longitudinal segment 42, and a second free strip 50$b$ are woven jointly in non-interlinked manner with respective planes 62 and 63 of non-interlinking.

In the layer crossing zone C1, the layers are crossed in such a manner that the layers of yarns coming from the bottom free strips 51$a$ and 52$a$ of the first and second transverse segments 51 and 52 are extended towards the second longitudinal segment 42, while the layers of yarns making up the free strips 50$a$ and 50$b$ come from the first longitudinal segment 41.

Figure 5:
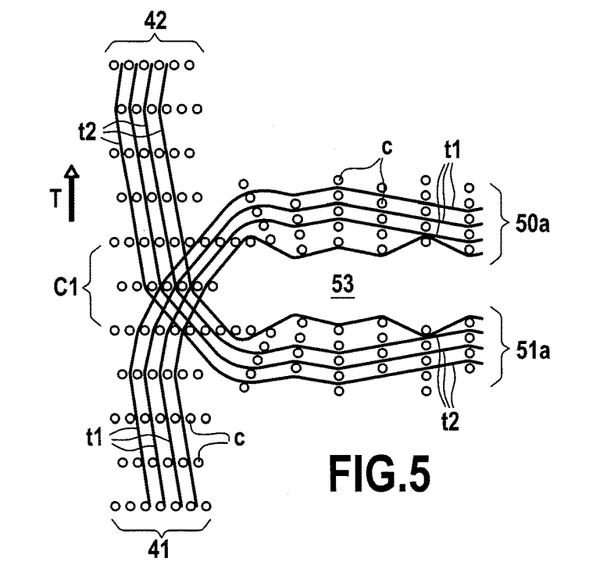
FIG. 5 shows in simplified manner the layer crossing of FIG. 4A.

Weaving techniques enabling layers to be crossed in this way are now well known in the field of 3D weaving. By way of illustration, FIG. 5 shows this layer crossing C1 in simplified manner. In the layer crossing zone C1, the weft yarns t1 interlinking the outermost warp yarns c of the first longitudinal segment 41 are deflected towards the outside in order to interlink, downstream from the layer crossing zone C1, the layers of warp yarns c of the first free strip 50$a$, while the weft yarns t2 interlinking the layers of the bottom free strip 51$a$ are deflected inwards so as to interlink the outermost layers of the second longitudinal segment 42. Thus, the weft yarns t1 and t2 cross in the layer crossing zone C1. In association with the non-interlinking technique, this layer crossing technique enables two non-interlinked strips 51$a$ and 50$a$ to be woven that extend each other while ensuring they are securely attached to the main sheet 41, 42.

Returning to FIGS. 4A and 4B and to weaving the preform 40, within the second zone D2 of non-interlinking, layer exits are arranged progressively along the weaving direction T between the second longitudinal segment 42 and each of the free strips 50a and 50b so as to thin down the second longitudinal segment 42 and thus the future airfoil 22 of the blade.

Once the weaving has been completed, the free strips 50a and 50b are cut to length so as to form respectively the top free strip 51b of the first transverse segment 51 and the top free strip 52b of the second transverse segment 52.

The bottom and top free strips of each of the transverse segments 51 and 52 are then folded towards each other as shown by the arrows so as to occupy their final transverse positions. Adhesive or stitching may be provided at the distal ends of the free strips. The transverse segments 51 and 52 thus form respectively the suction side platform 23 and the pressure side platform 24 of the blade 20.

Once the free strips 50a and 50b have been cut to length, the float yarns lying at the surface of the second longitudinal segment 42, i.e. the warp yarns that are not attached to any weft yarn as a result of the layers that have been exited, become accessible and can be sheared off.

The final configuration of the preform 40 is then as shown in FIG. 4B. It should be observed at this point that the qualifications "transverse" and "longitudinal" are given as a function of the final position of the segment in question, the transverse segments necessarily being woven longitudinally prior to being folded transversely.

The gaps between the bottom strips 51a, 52a and the top strips 51b, 52b of the transverse segments 51 and 52 then form internal cavities 53 that can receive a wide variety of inserts. Such inserts are described below with reference to FIGS. 6 to 10. The person skilled in the art will understand that the combinations of inserts described below are not exclusive, for example certain inserts may be combined with inserts of another example, in the same place or in a different place, as a function of the properties desired for the platforms 23 and 24.

Figure 6:
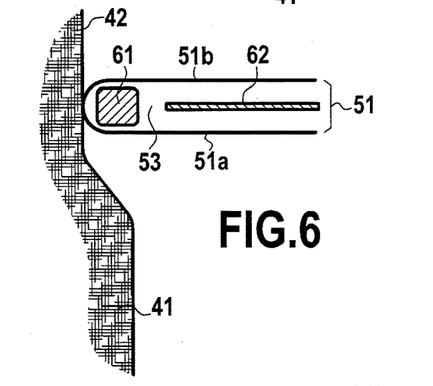
FIG. 6 shows a first embodiment of inserts arranged in the FIG. 4B preform.

FIG. 6 shows a first configuration in which the internal cavity 53 of the first transverse segment 51 comprises a gap filler 61 and a two-dimensional web 62.

The gap filler 61, e.g. a carbon rod, is arranged axially along the proximal end of the transverse segment 51, i.e. against the layer crossing zone C1.

The two-dimensional web 62 is made of carbon fibers and extends over all of the residual surface area of the cavity 53 that is not occupied by the gap filler 61: it serves in particular to thicken the transverse segment 51.

Figure 7:
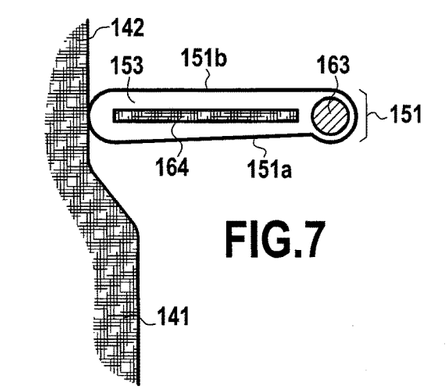
FIG. 7 shows a second embodiment of inserts arranged in the FIG. 4B preform.

FIG. 7 shows a second configuration in which the internal cavity 153 of the first transverse segment 151 comprises a stiffener 163 and a fiber block 164.

In this example, the distal ends of the bottom and top strips 151a and 151b are stitched together to close the distal end of the cavity 153. The stiffener 163 is a metal rod extending axially along the distal end of the transverse segment 151, i.e. against the distal edge of the cavity 153.

The fiber block 164 comprises carbon fibers that are woven three-dimensionally with a 3D interlock weave. Its number of layers and thus its thickness preferably varies. It extends over the entire residual surface area of the cavity 153 that is not occupied by the stiffener 163 in order to thicken and shape the transverse segment 151.

Figure 8:
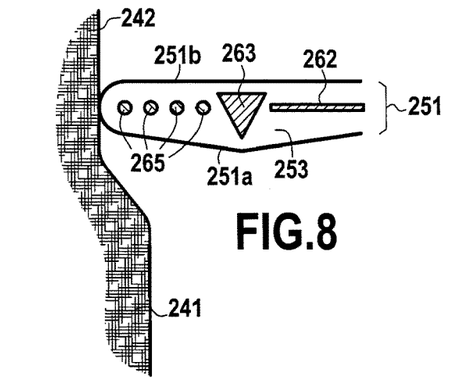
FIG. 8 shows a third embodiment of inserts arranged in the FIG. 4B preform.

FIG. 8 shows a third configuration in which the internal cavity 253 of the first transverse segment 251 comprises a stiffener 263, a web 262, and a series of wires 265.

The stiffener 263 is a glass fiber rod extending axially substantially in the middle of the cavity 253. It thus has an influence on the shape of the transverse segment 251 and thus on the shape of the final platform 23.

The two-dimensional web 262 is inserted between the stiffener 263 and the distal end of the cavity 253.

The wires 265, e.g. metal wires, extend axially and are arranged beside one another between the proximal end of the cavity 253 and the stiffener 263.

Figure 9:
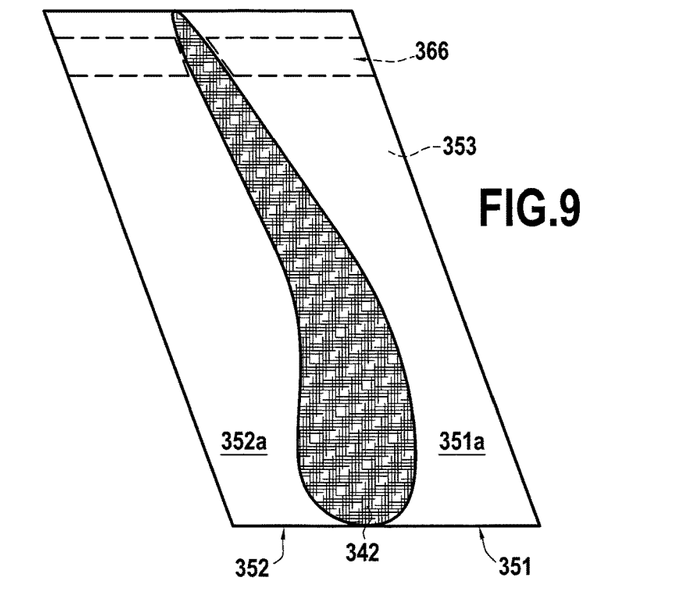
FIG. 9 shows a fourth embodiment of inserts arranged in the FIG. 4B preform.

FIG. 9 is a plan view showing a fourth configuration in which the internal cavity 353 of the first transverse segment 351 comprises a tangential stiffener 366 extending tangentially from the second longitudinal segment 342 to the distal end of the first transverse segment 351, substantially along the downstream end of the first transverse segment 351. An analogous stiffener is arranged in the cavity of the second transverse segment 352.

Figure 10:
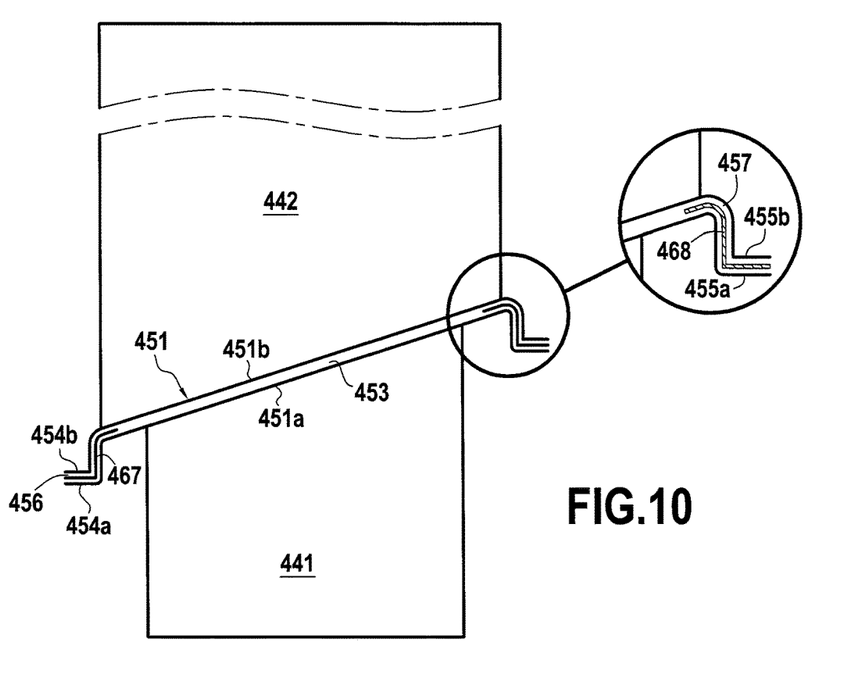
FIG. 10 shows a fifth embodiment of inserts arranged in the FIG. 4B preform.

FIG. 10 is a profile view showing a fifth configuration in which the bottom and top strips 451a and 451b of the first transverse segment 451 include respective upstream tabs 454a, 454b and downstream tabs 455a and 455b that are separated respectively by upstream and downstream gaps 456 and 457 extending the internal cavity 453.

Metal reinforcement 467, 468 is then inserted in each gap 456, 457 in order to reinforce the tabs 454 and 455. Once the blade is complete, these tabs 454 and 455 are for co-operating with the upstream shell and the downstream drum of the fan 2.

Whatever inserts are selected and arranged in the internal cavities 53 of the transverse segments 51 and 52, the preform 40 as prepared in this way can then be moistened in order to soften it and make it easier for its fibers to be taken out of register. The preform is then put into a shaping mold of inside space that matches the shape desired for the preform 40. The various inserts may optionally be fastened to the bottom and/or top strips of the transverse segment, e.g. by stitching or by adhesive.

Thereafter, the preform 40 is dried so that it stiffens, thus blocking the shape that was imposed during shaping. The preform 40 is then placed in an injection mold having the desired dimensions for the final blade 20, and into which a matrix is injected, in this example an epoxy resin. By way of example, such injection may be performed by the known resin transfer molding (RTM) method. At the end of this step, a blade 20 is obtained made of composite material having a preform 40 woven with carbon fibers embedded in an epoxy resin, and including platforms 23 and 24 that are provided with inserts held captive in the solidified matrix. Machining steps may optionally finish off this method for finalizing the blade 20.

All of the above-described examples lie within a weaving strategy, commonly referred to as "stacking up" in which the platforms are the result of uniting two free strips that were initially woven extending each other. Nevertheless, the present invention can naturally be implemented with other weaving strategies. For example, two other appropriate weaving strategies are described below with reference to FIGS. 11 and 12.

Figure 11:
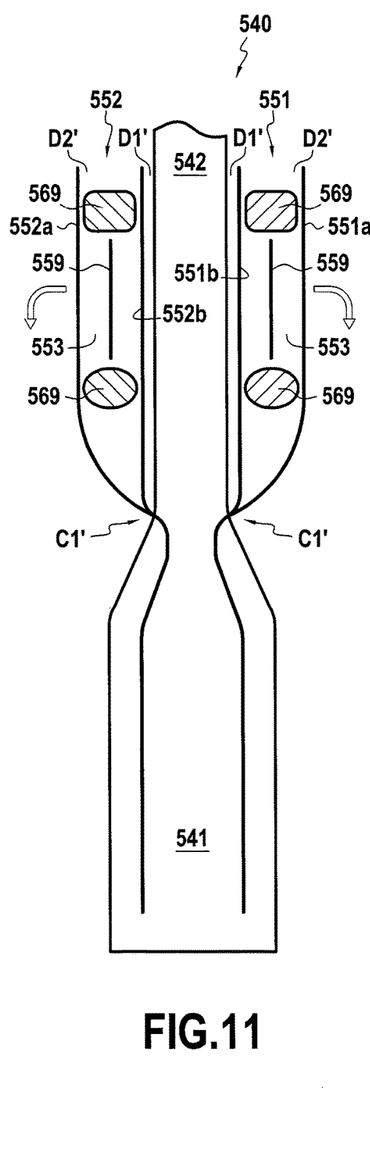
FIG. 11 is a diagram showing a second preform embodiment provided with inserts.

FIG. 11 is a diagram showing the preform 540 obtained in a second example of three-dimensional weaving. In this second example, there can be seen the first longitudinal segment 541 that ends up forming the root 21 of the blade 20, and the second longitudinal segment 542 that ends up forming the airfoil 22. In contrast, the transverse segments 551 and 552 are woven in a manner that is different from that of the first example: each of these segments come from a layer crossing C1' at the junction between the first and second longitudinal segments and a zone D1' of non-inter-linking separating them from the longitudinal segment 542. After weaving, the transverse segments 551 and 552 can thus be folded outwards in order to reach their final transverse positions. Such a method of weaving is described in particular in Document WO 2013/104852.

Using that known technique, an additional plane D2' of non-interlinking is added during weaving within each transverse segment 551, 552 so as to subdivide each transverse segment 551, 552 into two distinct free strips 551a, 551b and 552a, 552b, respectively. In analogous manner to the above-described embodiments, a variety of inserts 569 can then be arranged in the internal cavities 553 formed by the space between the strips 551a, 551b and 552a, 552b in each of the transverse segments 551, 552.

Figure 12:
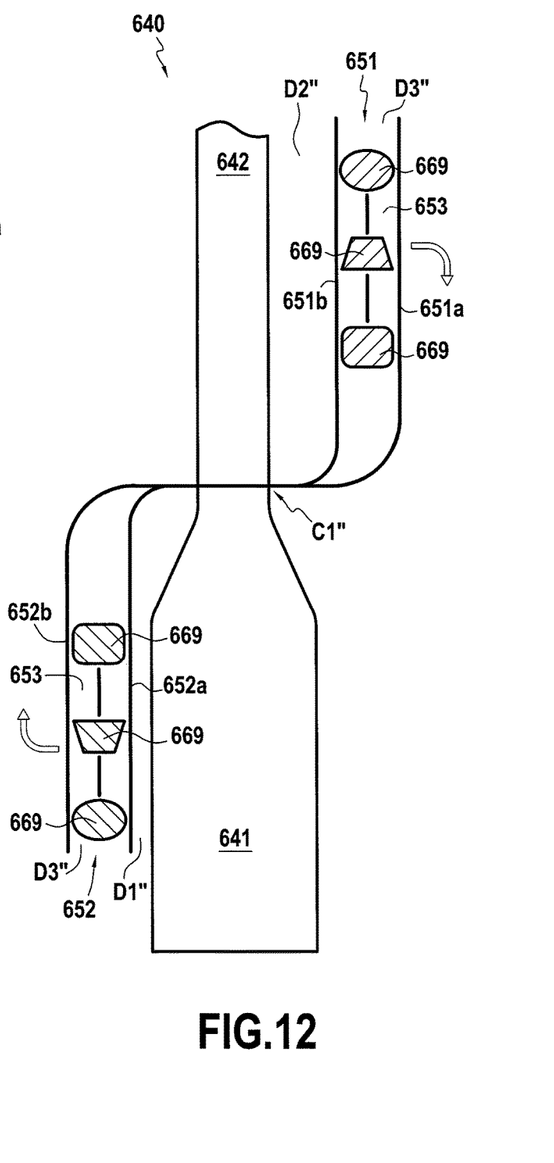
FIG. 12 is a diagram showing a third preform embodiment provided with inserts.

FIG. 12 is a diagram showing the preform 640 obtained by a third example of three-dimensional weaving. In this third example, there can be seen the first longitudinal segment 641, that ends up forming the root 21 of the blade 20, and the second longitudinal segment 642 that ends up forming the airfoil 22. In contrast, the transverse segments 651 and 652 are once more woven in a different manner.

In this third example, the layers constituting the first transverse segment 651 extend the layers constituting the second transverse segment 652 as a result of a layer crossing C1" passing right through the first longitudinal segment 641 from its pressure side towards its suction side, at the junction between the first and second longitudinal segments 641 and 642. A first zone D1" of non-interlinking then enables the second transverse segment 652 to be separated from the first longitudinal segment 641, while a second zone D2" of non-interlinking enables the first transverse segment 651 to be separated from the second longitudinal segment 642.

After weaving, the transverse segments 651 and 652 can thus be folded outwards in order to reach their final transverse positions. Such a method of weaving is described in particular in Document WO 2010/061140.

Using that known technique, an additional plane D3" of non-interlinking is added at the time of weaving within each transverse segment 651, 652 in order to subdivide each transverse segment 651, 652 into two distinct free strips 651a, 651b and 652a, 652b, respectively. In analogous manner to the above embodiments, a variety of inserts 669 can then be arranged in the internal cavities 653 formed by the spaces between the strips 651a, 651b and 652a, 652b of each of the transverse segments 651, 652.

Naturally, the above-described examples of weaving are merely examples from among numerous other possible examples that the person skilled in the art can recognize easily. In particular, it is possible to imagine other zones of non-interlinking or to use other weaving techniques such as layer crossings, layer exits, or thickness transitions in order to obtain an analogous preform shape in which the transverse segments are provided with respective internal cavities.

The embodiments or implementations described in the present description are given as non-limiting illustrations, and a person skilled in the art can easily, in the light of the description, modify these embodiments or implementations, or can envisage others, while remaining within the scope of the invention.

Furthermore, the various characteristics of these embodiments or implementations can be used singly or combined with one another. When they are combined, the characteristics may be combined as described above or in other ways, the invention not being limited to the specific combinations described in the present description. In particular, unless specified to the contrary, a characteristic described with reference to any one embodiment or implementation may be applied in analogous manner to another embodiment or implementation.

The invention claimed is:

1. A fiber preform for a turbine engine blade, the preform being obtained by three-dimensional weaving and comprising:
   a first longitudinal segment suitable for forming a blade root;
   a second longitudinal segment extending the first longitudinal segment upwards and suitable for forming an airfoil portion; and
   a first transverse segment extending transversely from the junction between the first and second longitudinal segments, and suitable for forming a first platform;
   wherein the first transverse segment includes at least a non-interlinked portion comprising a top strip and a bottom strip; and
   wherein at least an insert is arranged between the top and bottom strips of the non-interlinked portion of the first transverse segment.

2. A preform according to claim 1, wherein at least insert is a two-dimensional woven web.

3. A preform according to claim 1, wherein at least an insert is a stiffener including a rod or a rigid plate.

4. A preform according to claim 1, wherein at least an insert is arranged axially along the proximal end of the first transverse segment.

5. A preform according to claim 1, wherein at least an insert is arranged axially along the distal end of the first transverse segment.

6. A preform according to claim 1, wherein at least an insert is arranged tangentially, substantially along the longest tangential portion of the first transverse segment.

7. A preform according to claim 1, wherein at least an insert is arranged tangentially along the upstream or downstream end of the first transverse segment.

8. A preform according claim 1, wherein the first transverse segment includes at least an axial tab extending substantially axially from the upstream end and/or the downstream end of the first transverse segment, said axial tab comprising a top strip and a bottom strip; and
   wherein at least an insert is arranged between the top and bottom strips of said axial tab.

9. A preform according to claim 1, including a second transverse segment extending transversely from the junction between the first and second longitudinal segments extending the first transverse segment and going away therefrom, being suitable for forming a second platform;
   wherein the second transverse segment includes at least a non-interlinked portion comprising a top strip and a bottom strip; and
   wherein at least an insert is arranged between the top and bottom strips of the non-interlinked portion of the second transverse segment.

10. A blade for a turbine engine, the blade comprising:
    a blade root;
    an airfoil portion extending upwards from the blade root; and
    a platform extending transversely to the airfoil portion at the junction between the blade root and the airfoil portion;
    wherein the platform is made of composite material and has at least a portion including, embedded in a common matrix, a first piece of woven reinforcement, a second piece of woven reinforcement, and an insert arranged between the first and second pieces of woven reinforcement.

11. A blade according to claim 10, made in single-piece manner out of composite material by means of a fiber preform, said preform being shaped in a mold and being embedded in a matrix of organic type.

12. A bladed wheel for a turbine engine, including a plurality of blades according to claim 11.

13. A turbine engine including at least a blade according to claim 11.

* * * * *